United States Patent
Tung et al.

(10) Patent No.: US 9,680,548 B1
(45) Date of Patent: Jun. 13, 2017

(54) METHOD FOR CARRYING OUT INTELLIGENT FAST ANTENNA STEERING TECHNOLOGY (IFAST)

(71) Applicant: Cumitek Inc., Zhubei/Hsinchu County (TW)

(72) Inventors: Ming-Ta Tung, Zhubei (TW); Chia-Hsin Liao, Zhubei (TW)

(73) Assignee: CUMITEK INC. (TW)

( * ) Notice: Subject to any disclaimer, the term of this patent is extended or adjusted under 35 U.S.C. 154(b) by 0 days.

(21) Appl. No.: 14/948,383

(22) Filed: Nov. 23, 2015

(51) Int. Cl.
*H04B 7/06* (2006.01)

(52) U.S. Cl.
CPC ......... *H04B 7/0617* (2013.01); *H04B 7/0639* (2013.01)

(58) Field of Classification Search
CPC .. H04B 7/0634; H04B 7/0639; H04B 7/0617; H04B 7/086
See application file for complete search history.

(56) References Cited

U.S. PATENT DOCUMENTS

| | | | | |
|---|---|---|---|---|
| 8,311,160 B1* | 11/2012 | Zhang | ............... | H04L 5/0023 341/173 |
| 8,797,212 B1* | 8/2014 | Wu | ............... | H01Q 3/2605 342/368 |
| 2008/0153428 A1* | 6/2008 | Han | ............... | H04B 7/0417 455/69 |
| 2009/0067539 A1* | 3/2009 | Maltsev | ............... | H04B 7/0617 375/296 |
| 2009/0231197 A1* | 9/2009 | Richards | ............... | H01Q 3/2682 342/377 |
| 2010/0164805 A1* | 7/2010 | Niu | ............... | H01Q 1/125 342/377 |
| 2013/0044029 A1* | 2/2013 | Yang | ............... | H04B 7/0671 342/373 |
| 2013/0229309 A1* | 9/2013 | Thomas | ............... | H04B 7/0478 342/377 |
| 2014/0210668 A1* | 7/2014 | Wang | ............... | H01Q 3/34 342/372 |
| 2014/0253380 A1* | 9/2014 | Choi | ............... | H01Q 3/24 342/367 |
| 2016/0109563 A1* | 4/2016 | Bae | ............... | G01S 7/52047 600/443 |

* cited by examiner

*Primary Examiner* — Aristocratis Fotakis

(57) ABSTRACT

The present invention provides a method for carrying out an intelligent fast antenna steering technology (iFAST), and the method can be implemented by way of being integrated into a wireless network device under the form of software or firmware. Therefore, when the wireless network device installed with the method is initially set to work or rebooted, the method of the present invention would automatically set and adjust a plurality of wireless antennas of the wireless network device according to a variety of wireless network parameters of wireless network signals transceived by the wireless network, so as to make the wireless network signals radiated by the wireless network device be able to cover the application environment as comprehensive as possible; thereafter, a high-quality wireless network service is provided to the clients located in the application environment by the wireless network device.

9 Claims, 12 Drawing Sheets

(a)

(b)

METHOD FOR CARRYING OUT INTELLIGENT FAST ANTENNA STEERING TECHNOLOGY (IFAST)

BACKGROUND OF THE INVENTION

1. Field of the Invention

The present invention relates to the technology field of wireless antenna, and more particularly to a method for carrying out intelligent fast antenna steering technology (iFAST).

2. Description of the Prior Art

With the popularity of notebooks, tablet PCs and smart phones, wireless network service is needful for people anytime anywhere. So that, many countries regard how to provide a high-quality wireless network service with high coverage rate as one of key construction projects. For instance, New York City has turned 170 smart garbage bins into free WiFi hotspots for providing public and free wireless network service to city residents with 50-75 MB bandwidth.

With reference to FIG. 1, which illustrates a schematic operation diagram of an omni-directional antenna. It is well known that the commercial WiFi APs or routers are conventionally installed with at least one omni-directional antenna, which is one kind of dipole antenna. As diagram (a) of FIG. 1 shows, the omni-directional antenna radiates equal power in all azimuthal directions perpendicular to the axis of the antenna. Moreover, as diagram (b) of FIG. 1 shows, after compressing the vertical radiation waves of the omni-directional antenna, the transmission distance of the horizontal radiation waves of the omni-directional antenna is therefore extended, such that the radiation waves emitted by the omni-directional antenna are concentrated to cover a specific region or position.

Since the commercial WiFi APs or routers are conventionally disposed with at least one omni-directional antenna, the commercial WiFi APs or routers reveal some shortcomings and drawbacks on the wireless network covering range as follows. As the schematic application diagram for WiFi AP in FIG. 2 shows, when one single WiFi AP is disposed in a specific application environment such as an office environment, the wireless waves radiated from the WiFi AP cannot comprehensively cover the office environment, resulted from signal interference or insulation in walls at the office. So that, because there exists many dead corners in the office environment for the wireless network signal radiated by the WiFi AP, the electronic devices locating at the dead corners are unable to connect to the Internet through the WiFi AP normally.

Please continuously refer to FIG. 3, which illustrates a schematic application diagram of multi WiFi APs disposed in the application environment. In order to solve the drawback of one single WiFi AP mentioned above, users usually additionally disposed one or two WiFi APs in the application environment for enhancing the coverage rate of the wireless network covering the application environment. However, it is apparent that, although such solution can solve the drawback of one single WiFi AP mentioned above, the solution would cause the establishment cost for the wireless network covering the application environment increase.

Accordingly, in view of the commercial WiFi APs and routers having at least one omni-directional antenna cannot use their wireless network signals to comprehensively cover a specific application environment, the inventor of the present application has made great efforts to make inventive research thereon and eventually provided a method for carrying out intelligent fast antenna steering technology (iFAST).

SUMMARY OF THE INVENTION

The primary objective of the present invention is to provide a method for carrying out intelligent fast antenna steering technology (iFAST), wherein the method can be implemented by way of being integrated into a wireless network device under the form of software or firmware. Therefore, when the wireless network device installed with the method is initially set to work or rebooted, the method of the present invention would automatically set and adjust a plurality of wireless antennas of the wireless network device according to a variety of wireless network parameters of wireless network signals transceived by the wireless network, so as to make the wireless network signals radiated by the wireless network device be able to cover the application environment as comprehensive as possible; thereafter, a high-quality wireless network service is provided to the clients located in the application environment by the wireless network device.

Accordingly, in order to achieve the primary objective of the present invention, the inventor of the present invention provides a method for carrying out intelligent fast antenna steering technology (iFAST), comprising the steps of:

(1) starting the method for carrying out the iFAST on the wireless network device, and then accessing a plurality of foundational parameters set in the wireless network device;

(2) setting a data structure used to describe a comprehensive antenna direction scan cycle based on the foundational parameters, wherein each of the data structure has at least one entry record;

(3) accessing the at least one entry record of the data structures according to the plurality of wireless antennas of the wireless network device;

(4) determining whether all of the entry record from the data structure have been processed, if yes, proceeding to step (7); otherwise, proceeding to step (5);

(5) adjusting and modulating the plurality of wireless antennas of the wireless network device according to the entry record, and then accessing a plurality of wireless network parameters of the wireless network device;

(6) after a certain period of time (length of the period is defined as small-T), accessing the plurality of wireless network parameters of the wireless network device again, so as to calculate a best wireless network weight for the entry record corresponding to the wireless network device, and then storing the best wireless network weight in a weight field of the entry record corresponding to the data structure; subsequently, repeating the steps (3)-(6) until all the entry records in the data structures have been processed;

(7) reading out all of the best wireless network weights from each of the entry records of the data structure, and then identifying the entry record whose best wireless network weight field has the largest value;

(8) determining whether the largest wireless network weight is greater than or equal to a minimum valid empirical value, if yes, proceeding to step (9); otherwise, proceeding to step (10);

(9) adjusting and modulating the wireless antennas of the wireless network device based on the entry record who has largest wireless network weight value, and then proceeding to step (11);

(10) adjusting and modulating the wireless antennas of the wireless network device, so as to make the wireless antennas operate in omni-directional mode; and

(11) repeating the steps (2)-(10) after a time difference passes, wherein the time difference is calculated by subtracting a time for performing the steps (2)-(10) (scan-T) from a frequency for the comprehensive antenna scan cycle to be completed.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a method for carrying out intelligent fast antenna steering technology (iFAST) according to the present invention, embodiments of the present invention will be described in detail with reference to the attached drawings hereinafter.

Figure 1:
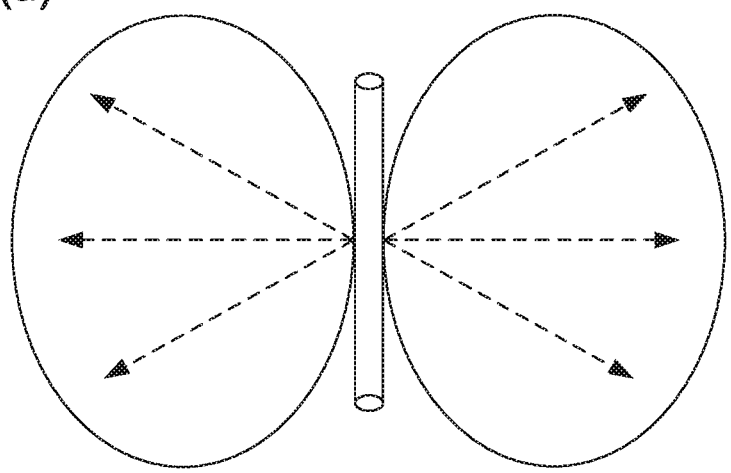
FIG. 1 shows a schematic operation diagram of an omni-directional antenna.
Figure 1:
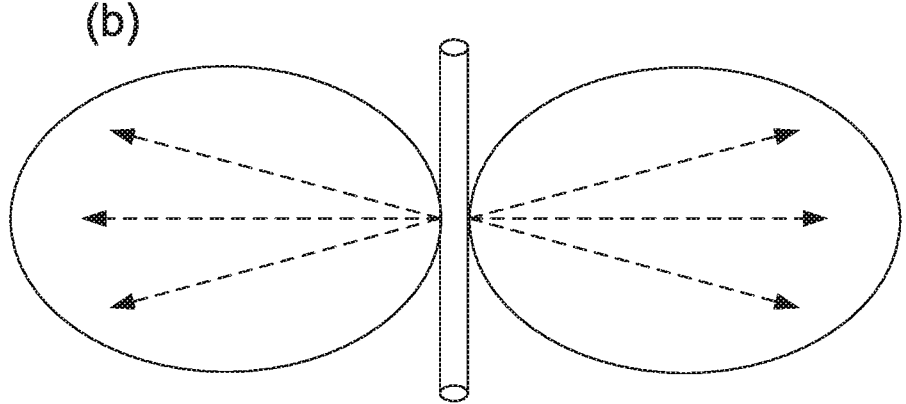
Figure 2:
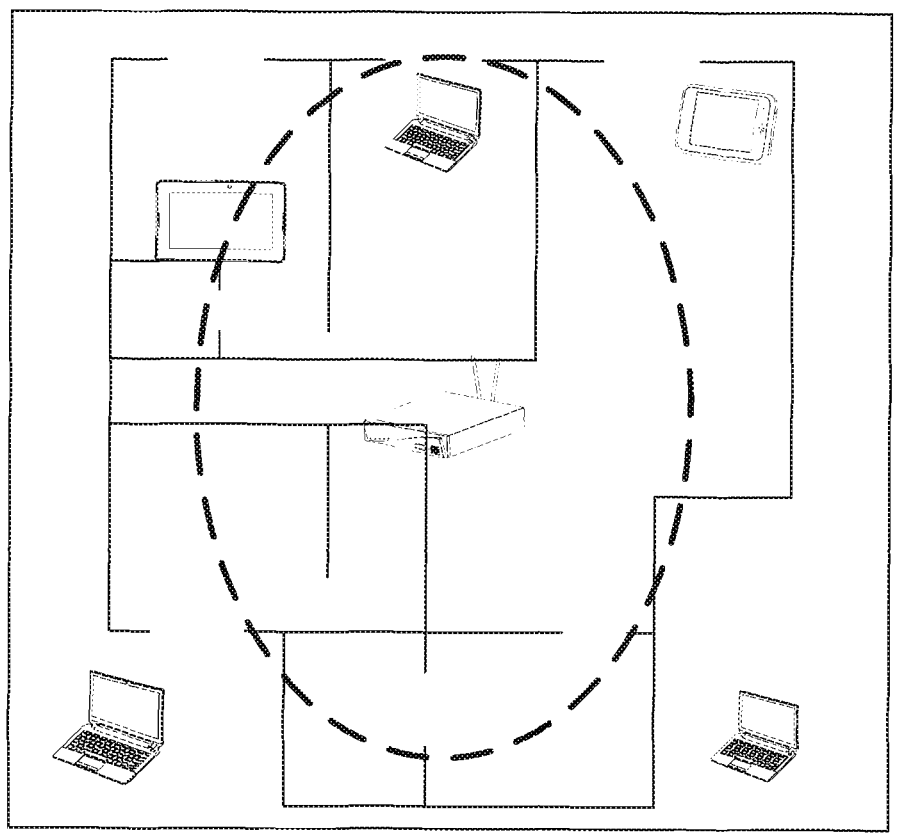
FIG. 2 shows a schematic application diagram for one signal WiFi AP disposed in an application environment.
Figure 3:
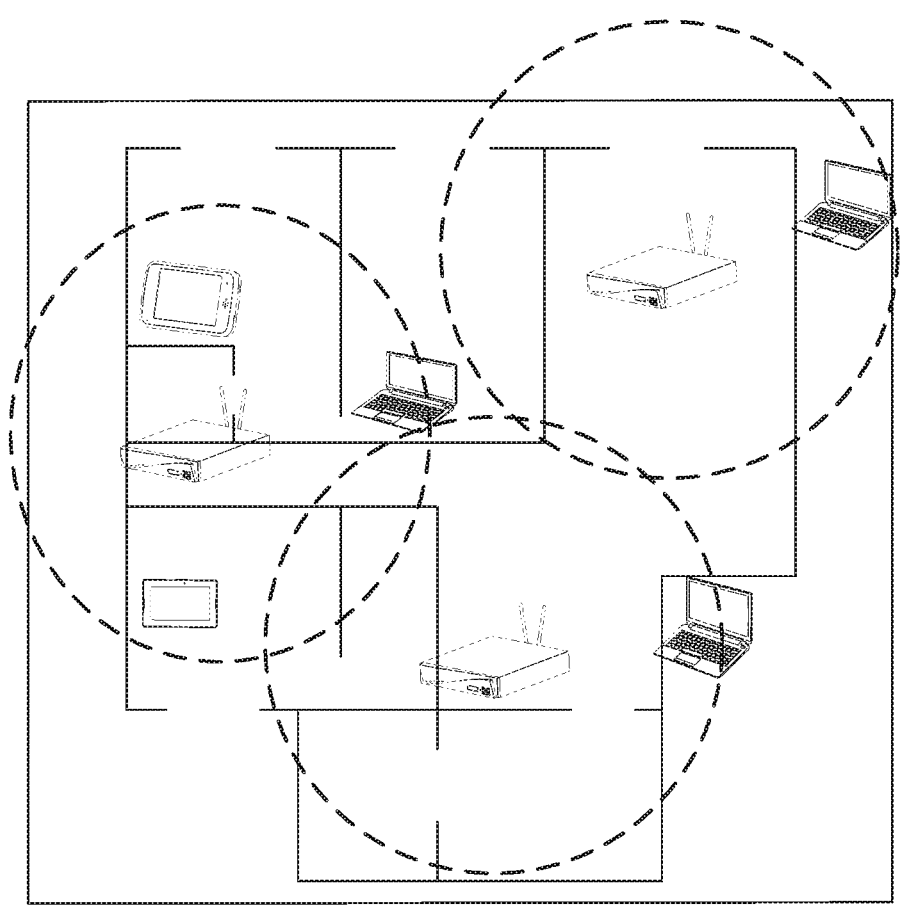
FIG. 3 shows a schematic application diagram of multi WiFi APs disposed in the application environment.
Figure 4:
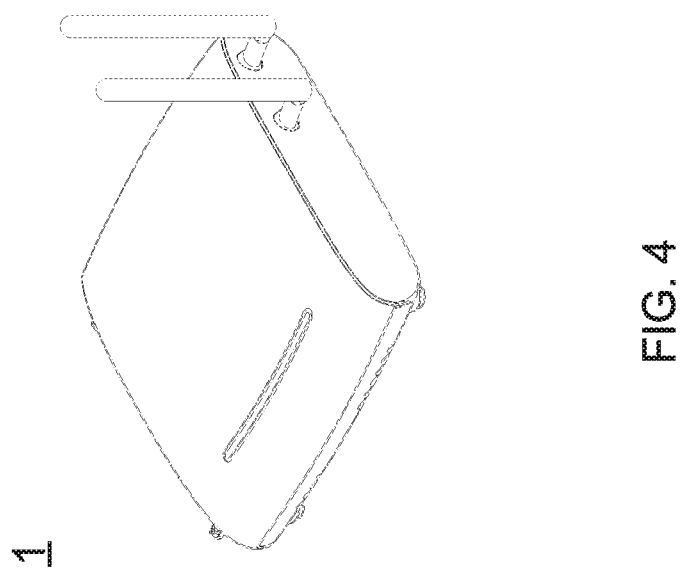
FIG. 4 shows a stereo view of a wireless network device disposed with a plurality of wireless antennas.
Figure 5A:
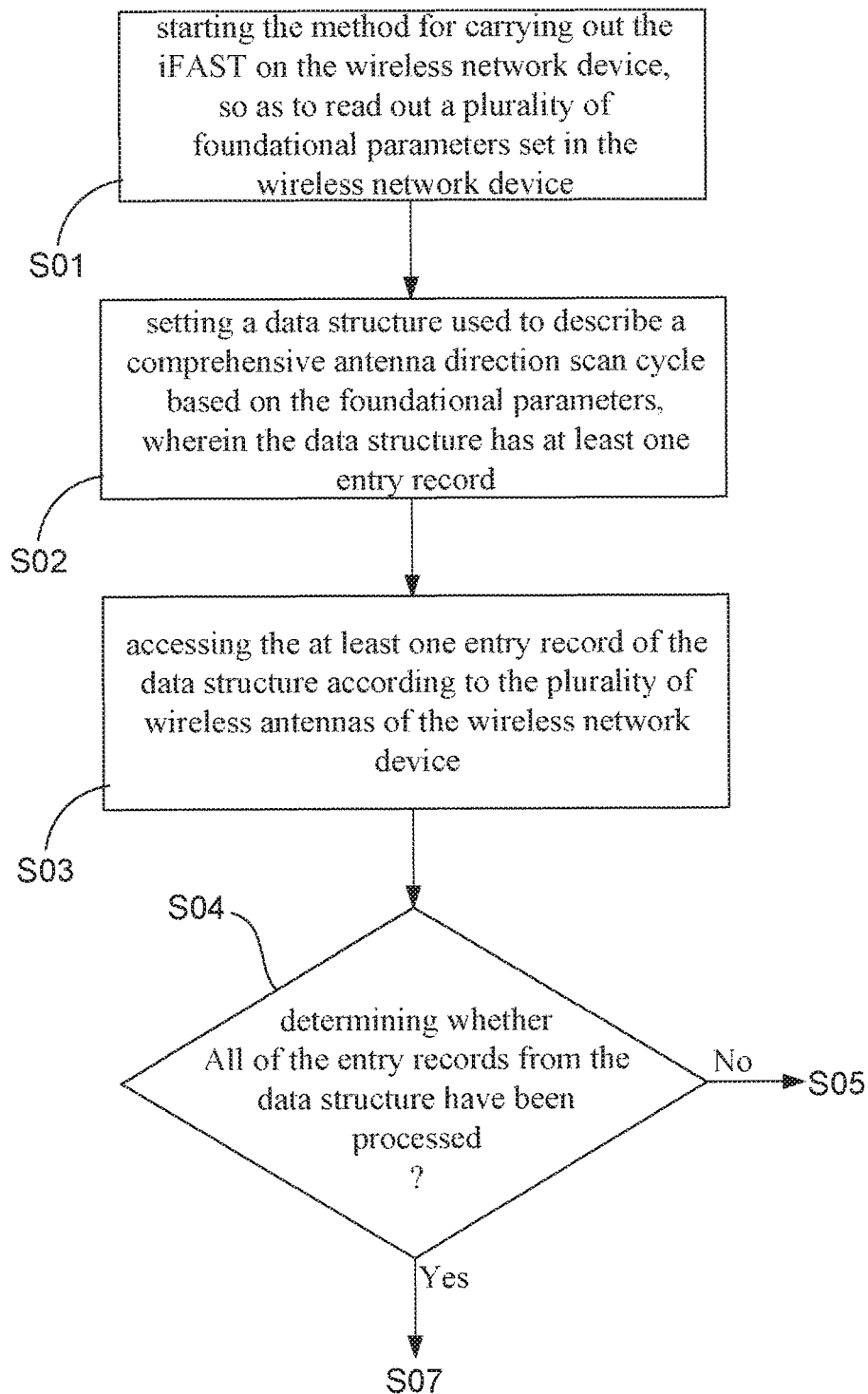
FIGS. 5A-5D show flow charts of a method for carrying out an intelligent fast antenna steering technology (iFAST) according to the present invention.
Figure 5B:
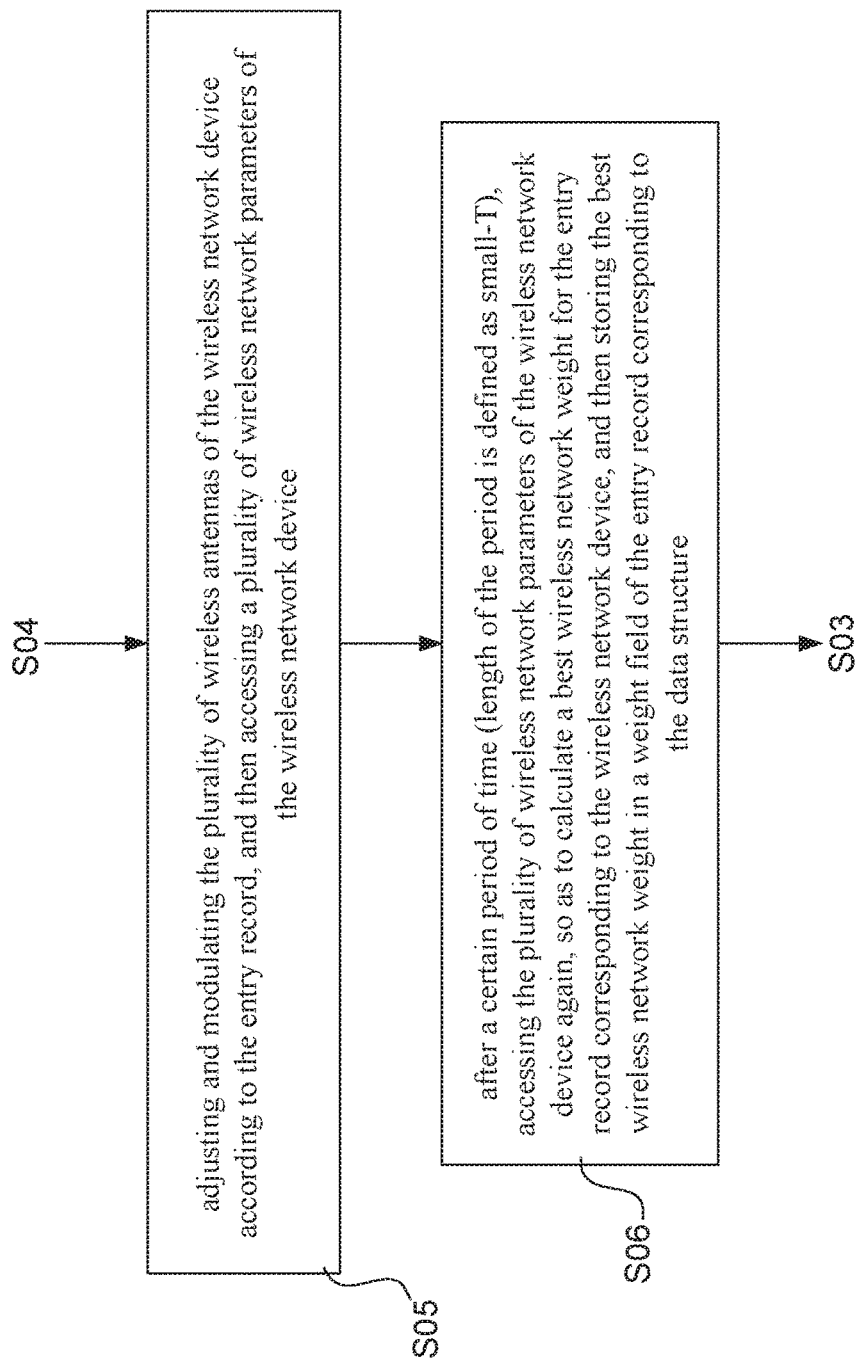
Figure 5C:
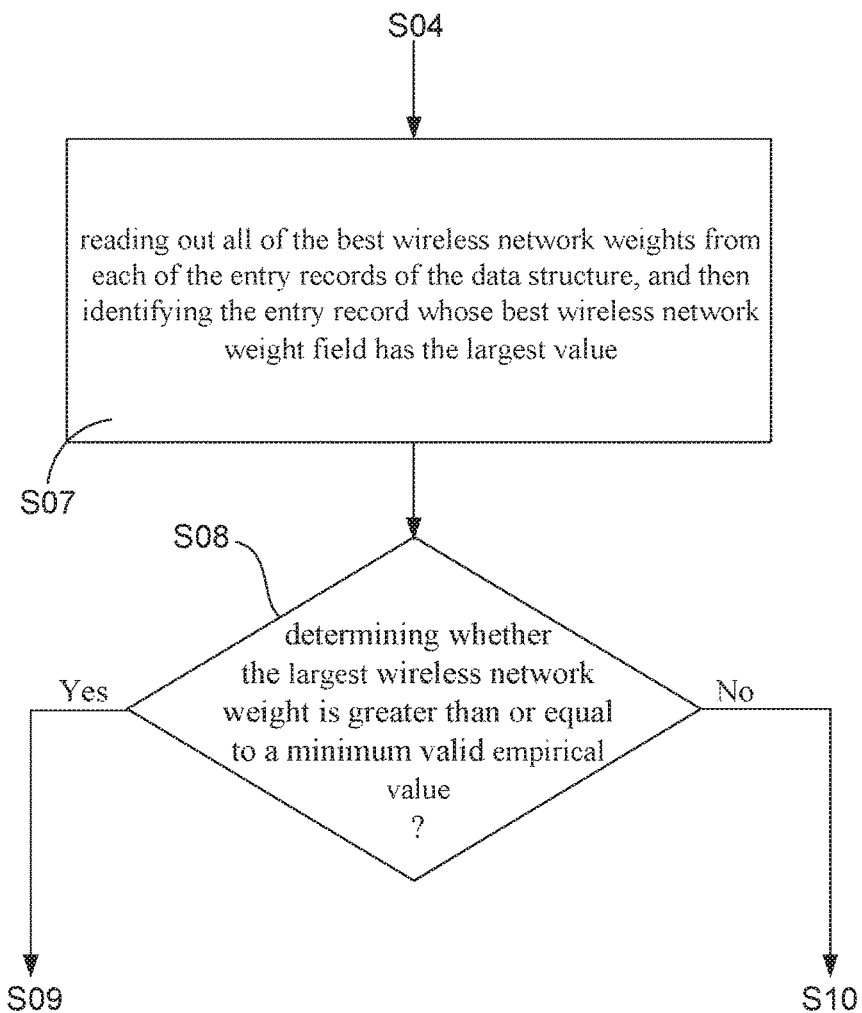
Figure 5D:
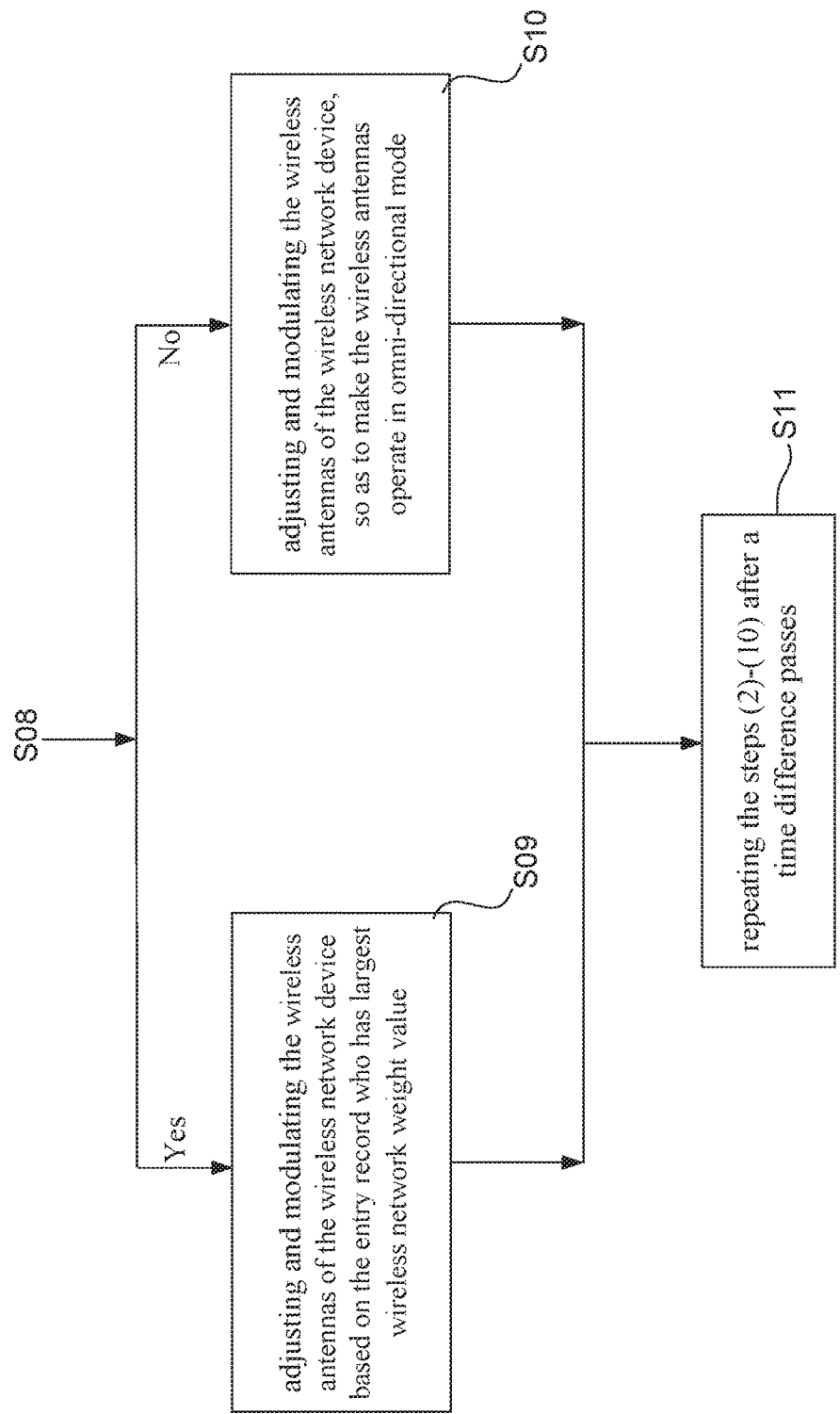

Please referring to FIG. 4, which illustrates a stereo view of a wireless network device disposed with a plurality of wireless antennas. Particularly, a method for carrying out an intelligent fast antenna steering technology (iFAST), provided by the present invention, is applied in the wireless network device 1 under the form of software or firmware. The software form means that the (iFAST) method is implemented through at least one programming language such as C language, MATLAB and FORTRAN, but is not limited to aforesaid three programming languages. On the other hand, the firmware form means that the (iFAST) method is performed by a micro controller embedded with the programming language. Herein, it needs to further explain that, although FIG. 4 using a WiFi accessing point (AP) to represent the wireless network device 1, but that does not used to limit the application target device and scope of this (iFAST) method. In practical application, the (iFAST) method can be integrated into a wireless network access point (AP), a wireless network router, a wireless network repeater, or a wireless network card.

With reference to FIG. 5A, FIG. 5B, FIG. 5C, and FIG. 5D, where flow charts of the method for carrying out an intelligent fast antenna steering technology (iFAST) are provided. Before introducing the (iFAST) method of the present invention, several notations used in the method are needed to be described in advance. The notations and their related descriptions are integrated in following Table (1).

TABLE (1)

| Notation | Description |
| --- | --- |
| iFAST | Intelligent Fast Antenna Steering Technology |
| antDirCap | Antenna Direction Capability of a specific wireless data stream |
| allDirScanArray[ ] | data structure used to describe a comprehensive antenna direction scan cycle |
| streamN | number of spatial stream of the wireless network device |
| small-T | time for smartly scanning antenna directions |
| scan-T | time for performing the steps (2)-(10) scan-T also means a time needed for performing all operations defined in data structures (allDirScanArray[ ]) |
| big-T | frequency for the comprehensive antenna direction scan cycle to be completed |
| dsnParam | wireless network parameters, including: TxRate, TxSuccess, RxRate, RxSuccess, RSSI, TxFailCount, RxWithCRC, RxDuplicate, RxDropDueToOutOfResource, FalseCCA, AMPDU TxFailCount, AMPDU PER/RSSI |
| best-W | best wireless network weight |

As the flow charts shown in FIG. 5A-FIG. 5D, the step (S01) is firstly executed for reading out a plurality of foundational parameters set in the wireless network device after the (iFAST) method is started. Next, the method flow proceeds to step (S02) for setting a data structure (i.e., allDirScanArray[ ]) used to describe a comprehensive antenna direction scan cycle based on the foundational parameters, wherein the data structures have at least one entry record.

Figure 6:
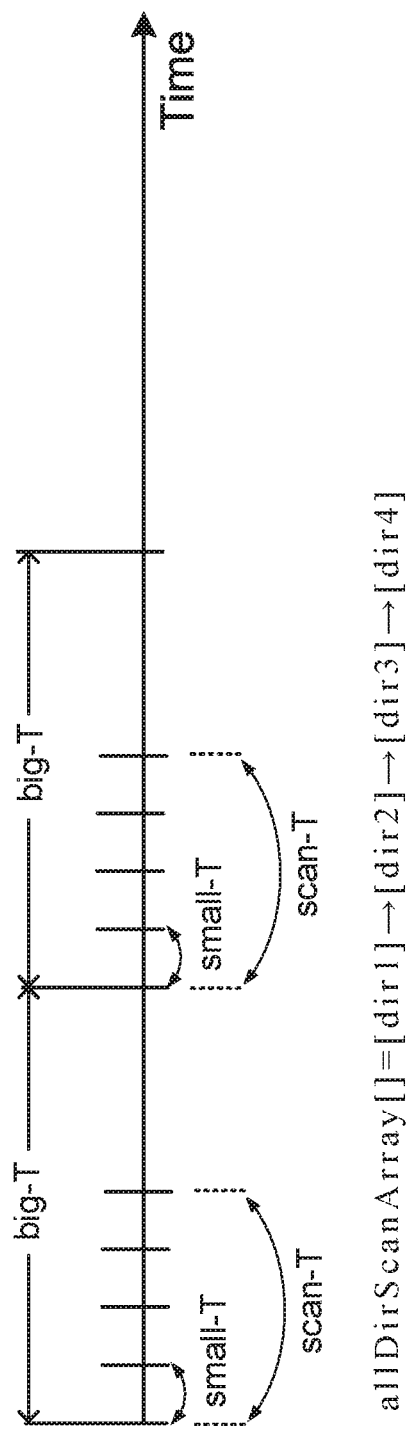
FIG. 6 shows a time axis diagram.

In the step (S01), the foundational parameters needed to be read out are antDirCap, stream, small-T, and big-T. For example, as the time axis diagram of FIG. 6 shows, a portion of foundational parameters must be set before starting the iFAST-based software or firmware installed in the wireless network device 1, such as antDirCap, streamN and big-T. Therefore, after the foundational parameters of antDirCap and streamN are obtained, a time for performing the steps (2)-(10) of the (iFAST) method can be calculated by using following equation (1): scan-T=small-T×(antDirCap)$^{streamN}$. Herein, it needs to further explain that, scan-T also means the time needed for performing all operations defined in data structures (allDirScanArray[ ]).

As shown in FIG. 4 and FIG. 6, when the values of antDirCap and streamN of the wireless network device 1 are both "2", the calculated scan-T is greater than small-T by 4 times, such that the data structures (allDirScanArray[ ]) includes 4 entry records, i.e., entry record 1, entry record 2, entry record 3, and entry record 4. Correspondingly, variables dir1, dir2, dir3, and dir4 are used for representing the field of antenna direction in the four entry records of the data structures.

Subsequently, step (S03) is executed for accessing the at least one entry record of the data structures (allDirScanArray[ ]) according to the plurality of wireless antennas of the wireless network device 1, and then step (S04) determines whether all of the entry record from the data structure have been processed.

Figure 7:
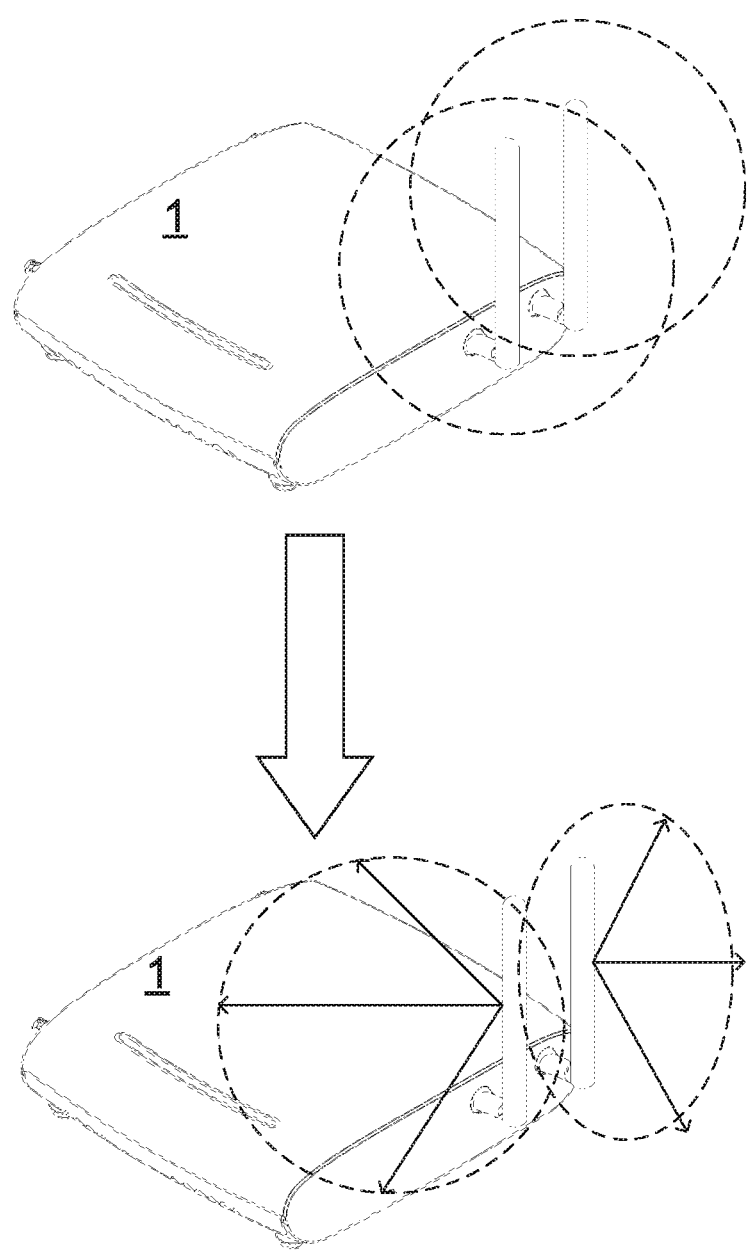
FIG. 7 shows a schematic diagram of the wireless antenna of the wireless network device to be adjusted.

Moreover, if the entry record of the step (S04) is "NO", the method flow is proceeded to step (S05) for adjusting and modulating the plurality of wireless antennas of the wireless network device 1 according to the entry record, and subsequently accessing a plurality of wireless network parameters of the wireless network device 1. Please refer to FIG. 7, which illustrates a schematic diagram of the wireless antenna of the wireless network device to be adjusted. As FIG. 7 shows, after compressing the vertical radiation waves of the wireless antenna of the wireless network device 1, the transmission distance of the horizontal radiation waves of the wireless antennas are therefore extended, such that the radiation waves radiated by the wireless antennas are concentrated to cover a specific region or position. Herein, it needs to emphasize that FIG. 7 is used to introduce the way for adjusting and modulating the wireless antenna, that is not used for limiting the adjusting and modulating way for the wireless antennas.

After the step (S05) is completed, step (S06) is then executed after a certain period of time (length of the period is defined as small-T) has passed, so as to read out the plurality of wireless network parameters of the wireless network device again, for calculating a best wireless network weight for the entry record corresponding to the wireless network device, and then storing the best wireless network weight in a weight field of the entry record corresponding to the data structure.

After completing the step (S06), the steps (3)-(6) must be repeated until all the entry records in the data structures have been processed. For instance, if the data structure allDirScanArray[ ] includes 4 entry records, the (iFAST) method need to process all these four entry records one by one, so as to obtain the corresponding best network weight values. Herein, the said client is not limited to be an electronic product such as a notebook, the client may also be a wireless network AP, a wireless network router or a wireless network repeater.

Of course, the above mentioned best wireless network weight calculated by different engineers would be different. In the present invention, inventors herein provide following equations for finding the best wireless network weight.

$$\text{best-}W = (TxRate \times TxSuccess) + (RxRate \times RxSuccess) + (RSSI \times k) \quad \text{[equation (2)]}$$

$$\text{best-}W = TxFailCount + RxWithCRC + RxDuplicate + RxDropDueToOutOfResource + FalseCCA + AMPDU\ TxFailCount + 0.5(AMPDU\ PER/RSSI) \quad \text{[equation (3)]}$$

Although the wireless network parameters used in the two equations have already known by wireless network engineers, the notations and the related descriptions for those wireless network parameters are still integrated in following Table (2).

TABLE (2)

| Notation | Description |
| --- | --- |
| TxRate | transition rate of the wireless network device |
| TxSuccess | count of the data frames successfully send out by the wireless network device |
| RxRate | receive rate of the wireless network device |
| RxSuccess | count of the data frames successfully received by the wireless network device |
| RSSI | value of Received Signal Strength Indicator |
| k | experience constant |
| TxFailCount | count of the data frames fail to be send out by the wireless network device |
| RxWithCRC | count of the data frames including cyclic redundancy check received by the wireless network device |
| RxDuplicate | count of duplicate data frames |
| RxDropDueToOutOfResource | count of the data frames selected to be discarded resulted from all resources are in use |

TABLE (2)-continued

| Notation | Description |
| --- | --- |
| FalseCCA | count of False Clear Channel Assessment |
| AMPDU TxFailCount | false count of the data frames at MAC layer |
| PER | value of Packet Error Rate |

As the flow charts of FIG. 5A-FIG. 5D show, when the determining result of the step (S04) is "YES", the method flow is proceeded to step (S07) for reading out all of the best wireless network weights from each of the entry record of the data structure, and then identify the entry record whose best wireless network weight field has the largest value.

After the step (S07) is finished, the method flow next proceeds to step (S08) for determining whether the largest wireless network weight is greater than or equal to the said minimum valid empirical value. When the determining result of the step (S08) is "Yes", the method is proceeded to step (S09), so as to adjust and modulate the wireless antennas of the wireless network device based on the entry record who has largest wireless network weight value. Subsequently, after a time difference passes, step (S11) then is executed for repeating the steps (2)-(10), wherein the time difference is calculated by subtracting scan-T from big-T.

On the contrary, when the determining result of the step (S08) is "No", the method flow is proceeded to step (S10) for adjusting and modulating the wireless antennas of the wireless network device, so as to make the wireless antennas of the wireless network device, so as to make the wireless antennas operate in omni-directional mode. Such condition means that the best wireless network weight suitable for the application environment cannot be found out. However, even if one data structure (allDirScanArray[ ]) cannot find out the corresponding best wireless network weight, it does not mean all of the data structures cannot find out their corresponding best wireless network weights. For above reasons, after using the (iFAST) method to adjust the wireless antennas of the wireless network device 1, maybe a portion of the wireless antennas are adjusted to transceiver wireless network signals by omni-directional way but others of the wireless antennas are adjusted and modulated based on the entry records having the suitable largest wireless network weight of the data structures.

Thus, above descriptions have fully introduced the execution steps and related technology features of the (iFAST) method proposed by the present invention. Next, in order to prove the practicability of the (iFAST) method, a variety of experiments have been completed.

EXPERIMENT I: Disposing Wireless Network Device in Residence Housing.

Figure 8:
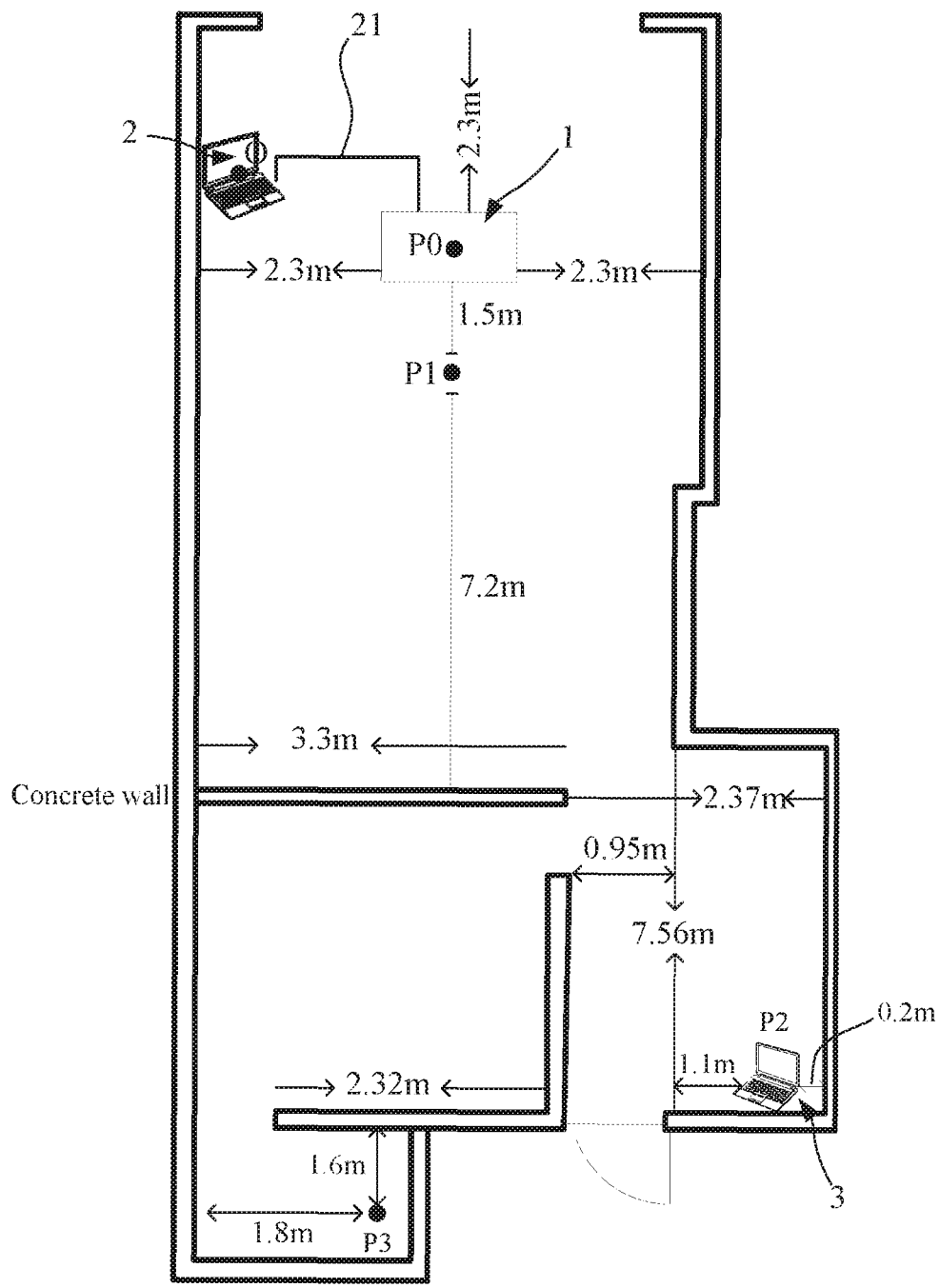
FIG. 8 shows a layout diagram of a normal residence housing.

Please refer to FIG. 8, which illustrates a layout diagram of a normal residence housing. As shown in FIG. 8, a network server 2, a wireless network device 1 integrated with the (iFAST) method of the present invention, and a wireless network router 3 are disposed at O position, P1 position and P2 position, respectively. In the EXPERIMENT I, the network server 2 is a IxChariot Server and the wireless network router 3 is a 2×2/11n wireless network router. In addition, the network server 2 is connected to the wireless network device 1 through an Ethernet 21. The experimental data of the EXPERIMENT I are recorded in following Tables (3)-(5). Thus, it can easily find that, comparing to the conventional wireless network device(s), the wireless network device 1 integrated with the (iFAST) method performs higher wireless throughput. The experimental data means that the wireless network signals radiated by the wireless network device 1 are able to cover the normal residence housing as comprehensive as possible, and a high-quality wireless network service is provided to the clients located in the normal residence housing by the wireless network device 1.

TABLE (3)

2.4G Channel 13

| | Throughput(Mbps) | | | |
|---|---|---|---|---|
| Antenna angle | Position P1 disposed with the conventional wireless network device installed diploe antennas | Position P1 disposed with the wireless network device integrated with the (iFAST) method | ΔTP (Mbps) | ΔTP (%) |
| 0° | 172.151 | 190.626 | 18.475 | 11% |
| 45° | 153.620 | 140.023 | 13.597 | −9% |
| 90° | 167.284 | 189.578 | 22.294 | 13% |
| 135° | 167.691 | 171.164 | 3.473 | 2% |
| 180° | 135.942 | 182.088 | 46.146 | 34% |
| 225° | 145.338 | 176.798 | 31.460 | 22% |
| 270° | 142.981 | 168.685 | 25.703 | 18% |
| 315° | 171.240 | 186.038 | 14.798 | 9% |
| Largest Gain(%) | | | 34% | |
| Average Gain (%) | | | 12% | |

TABLE (4)

2.4G Channel 13

| | Throughput(Mbps) | | | |
|---|---|---|---|---|
| Antenna angle | Position P2 disposed with the conventional wireless network device installed diploe antennas | Position P2 disposed with the wireless network device integrated with the (iFAST) method | Δ TP (Mbps) | Δ TP (%) |
| 0° | 57.959 | 81.536 | 23.577 | 41% |
| 45° | 60.453 | 77.071 | 16.618 | 27% |
| 90° | 50.652 | 71.492 | 20.840 | 41% |
| 135° | 70.835 | 71.322 | 0.487 | 1% |
| 180° | 51.831 | 75.089 | 23.258 | 45% |
| 225° | 52.910 | 78.098 | 25.188 | 48% |
| 270° | 63.169 | 76.123 | 12.953 | 21% |
| 315° | 50.239 | 88.594 | 38.355 | 76% |
| Largest Gain(%) | | | 76% | |
| Average Gain (%) | | | 34% | |

TABLE (5)

2.4G Channel 13

| | Throughput(Mbps) | | | |
|---|---|---|---|---|
| Antenna angle | Position P3 disposed with the conventional wireless network device installed diploe antennas | Position P3 disposed with the wireless network device integrated with the (iFAST) method | Δ TP (Mbps) | Δ TP (%) |
| 0° | 25.325 | 39.851 | 14.526 | 57% |
| 45° | 16.667 | 38.349 | 21.682 | 130% |
| 90° | 33.931 | 35.719 | 1.787 | 5% |
| 135° | 26.170 | 33.762 | 7.592 | 29% |

TABLE (5)-continued 2.4G Channel 13

| | Throughput(Mbps) | | | |
|---|---|---|---|---|
| Antenna angle | Position P3 disposed with the conventional wireless network device installed diploe antennas | Position P3 disposed with the wireless network device integrated with the (iFAST) method | Δ TP (Mbps) | Δ TP (%) |
| 180° | 33.869 | 40.015 | 6.146 | 18% |
| 225° | 25.996 | 36.863 | 10.867 | 42% |
| 270° | 20.270 | 29.974 | 9.704 | 48% |
| 315° | 18.967 | 53.390 | 34.422 | 181% |
| Largest Gain(%) | | | 181% | |
| Average Gain (%) | | | 64% | |

EXPERIMENT II: Disposing Wireless Network Device in Basement.

Figure 9:
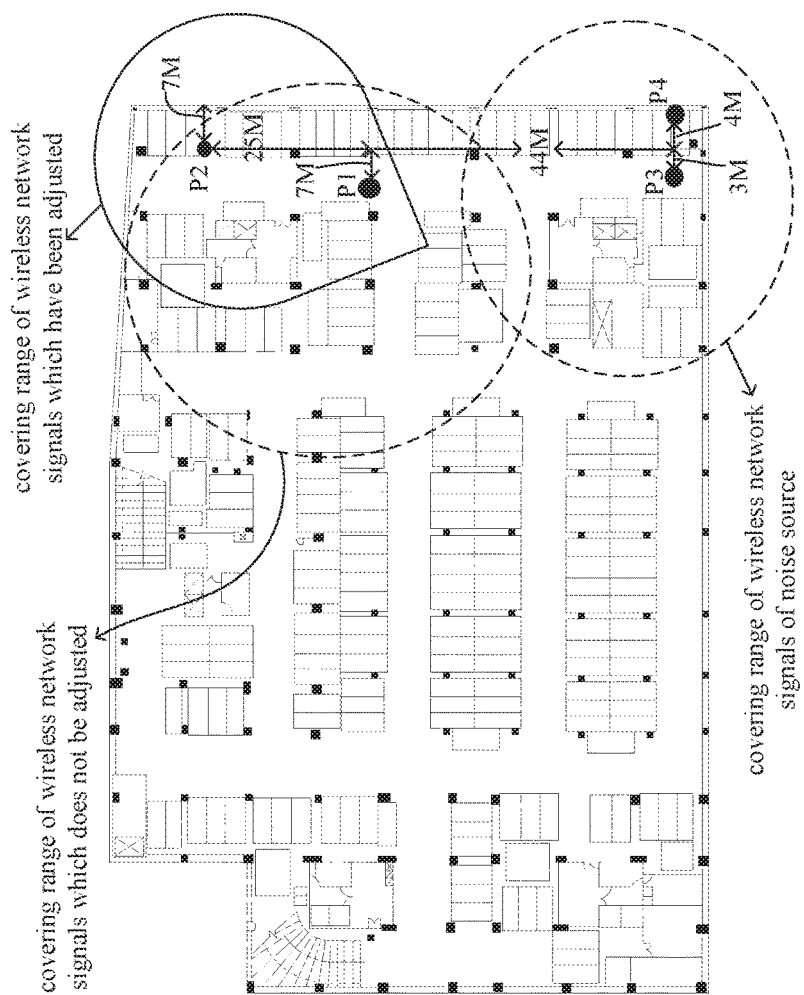
FIG. 9 shows a layout diagram of a basement.

Please refer to FIG. 9, which illustrates a layout diagram of a basement. As shown in FIG. 9, a network server 2, a client 3a, a wireless network device 1b being as a first disturbance source, and a client 3b being as a second disturbance source are respectively disposed at P1 position, P2 position, P3 position, and P4 position of the B5 basement. The experimental data of the EXPERIMENT II are recorded in following Tables (6)-(7), wherein the experimental data of Table (6) is measured under the weak signal interference produced by the two disturbance sources, and the experimental data of Table (7) is measured under the strong signal interference produced by the two disturbance sources. Therefore, comparing to the conventional wireless network device(s), it can easily find that the wireless network device 1 integrated with the (iFAST) method performs higher wireless throughput. The experimental data means that the wireless network signals radiated by the wireless network device 1 are able to cover the normal residence housing as comprehensive as possible, and a high-quality wireless network service is provided to the clients located in the normal residence housing by the wireless network device 1.

TABLE (6)

2.4G Channel 8

| | Throughput(Mbps) | | | |
|---|---|---|---|---|
| Antenna angle | Position P1 disposed with the conventional wireless network device installed diploe antennas | Position P1 disposed with the wireless network device integrated with the (iFAST) method | Δ TP (Mbps) | Δ TP (%) |
| 0° | 37.050 | 41.044 | 3.994 | 11% |
| 45° | 21.055 | 33.062 | 12.007 | 57% |
| 90° | 41.623 | 49.626 | 8.003 | 19% |
| 135° | 42.485 | 44.412 | 1.927 | 5% |
| 180° | 29.549 | 52.927 | 23.378 | 79% |
| 225° | 37.613 | 46.382 | 8.769 | 23% |
| 270° | 37.221 | 36.516 | 0.705 | −2% |
| 315° | 37.954 | 41.945 | 3.991 | 11% |
| Largest Gain(%) | | | 79% | |
| Average Gain (%) | | | 25% | |

TABLE (7)

| | 2.4G Channel 8 | | | |
|---|---|---|---|---|
| | Throughput(Mbps) | | | |
| Antenna angle | Position P1 disposed with the conventional wireless network device installed diploe antennas | Position P1 disposed with the wireless network device integrated with the (iFAST) method | Δ TP (Mbps) | Δ TP (%) |
| 0° | 29.224 | 36.577 | 7.353 | 25% |
| 45° | 8.660 | 22.181 | 13.521 | 156% |
| 90° | 7.536 | 11.309 | 3.773 | 50% |
| 135° | 15.340 | 42.180 | 26.840 | 175% |
| 180° | 20.737 | 45.329 | 24.592 | 119% |
| 225° | 34.203 | 37.034 | 2.831 | 8% |
| 270° | 19.133 | 26.982 | 7.849 | 41% |
| 315° | 35.921 | 32.889 | 3.032 | −8% |
| Largest Gain(%) | | | 175% | |
| Average Gain (%) | | | 71% | |

Therefore, through above descriptions, the method for carrying out an intelligent fast antenna steering technology (iFAST) provided by the present invention has been introduced completely and clearly; in summary, the present invention includes the advantages of:

(1) Differing from the conventional technology disposing multi WiFi AP devices in a specific application environment for enhancing the wireless network covering range of the specific application environment, the present invention provides a method for carrying out an intelligent fast antenna steering technology (iFAST), wherein the method is integrated into a wireless network device by software or firmware form. Therefore, when the wireless network device is initially set to work or rebooted, the method of the present invention would automatically set and adjust a plurality of wireless antennas of the wireless network device according to a variety of wireless network parameters of wireless network signals transceived by the wireless network, so as to make the wireless network signals radiated by the wireless network device be able to cover the application environment as comprehensive as possible; thereafter, a high-quality wireless network service is provided to the clients located in the application environment by the wireless network device.

The above description is made on embodiments of the present invention. However, the embodiments are not intended to limit scope of the present invention, and all equivalent implementations or alterations within the spirit of the present invention still fall within the scope of the present invention.

What is claimed is:

1. A method for carrying out an intelligent fast antenna steering technology (iFAST), being applied in a wireless network device having a plurality of wireless antennas; wherein the wireless network device is disposed in an application environment, and the said method comprising the steps of:
(1) starting the method for carrying out the iFAST on the wireless network device, so as to read out a plurality of foundational parameters set in the wireless network device;
(2) setting a data structure used to describe a comprehensive antenna direction scan cycle based on the foundational parameters, wherein the data structure has a plurality of entry records;
(3) accessing the entry records of the data structure according to the plurality of wireless antennas of the wireless network device;
(4) determining whether all of the entry records from the data structure have been processed, if yes, proceeding to step (7); otherwise, proceeding to step (5);
(5) adjusting and modulating the plurality of wireless antennas of the wireless network device according to an entry record that has not been processed, and then accessing a plurality of wireless network parameters of the wireless network device;
(6) after a specific period of time defined as a small-T, accessing the plurality of wireless network parameters of the wireless network device again, so as to calculate a best wireless network weight for the entry record corresponding to the wireless network device, and then storing the best wireless network weight in a weight field of the entry record corresponding to the data structure; subsequently, repeating the steps (3)-(6) until all the entry records in the data structures have been processed;
(7) reading out all of the best wireless network weights from each of the entry records of the data structure, and then identifying the entry record whose best wireless network weight has the largest value;
(8) determining whether the largest wireless network weight is greater than or equal to a minimum valid empirical value, if yes, proceeding to step (9); otherwise, proceeding to step (10);
(9) adjusting and modulating the wireless antennas of the wireless network device based on the entry record who has largest wireless network weight value, and then proceeding to step (11);
(10) adjusting and modulating the wireless antennas of the wireless network device, so as to make the wireless antennas operate in omni-directional mode; and
(11) repeating the steps (2)-(10) after a time difference passes, wherein the time difference is calculated by subtracting a time for performing the steps (2)-(10) from a time for the comprehensive antenna direction scan cycle.

2. The method of claim 1, wherein the wireless network device is selected from the group consisting of: wireless network access point (AP), wireless network router, wireless network repeater, and wireless network card.

3. The method of claim 1, wherein the foundational parameters comprises:
antenna direction capability, number of spatial streams, time for smartly scanning antenna directions, and a frequency for the comprehensive antenna direction scan cycle to be completed.

4. The method of claim 1, wherein the determination of the step (4) is completed by verifying whether the largest wireless network weight stored in the weight field of the identified entry record is greater than or equal to the minimum valid empirical value.

5. The method of claim 1, wherein the minimum valid empirical value described in the step (8) varies with the difference of the application environment provided with the wireless network therein.

6. The method of claim 3, further comprises one step (5a) between the step (5) and the step (6) as follows:
(5a) waiting for one single time for smartly scanning antenna directions to pass.

7. The method of claim 3, wherein the said time for performing the steps (2)-(10) is calculated by following equation (1): scan-T=small-T×(antDirCap)streamN;

wherein the notation scan-T represents a time for performing the steps (2)-(10), the notation small-T representing a specific period of time for smartly scanning antenna directions, the notation antDirCap representing an antenna direction capability of one specific wireless data stream, and the notation streamN representing a number of spatial streams.

8. The method of claim 3, wherein the said best wireless network weight is calculated by following equation (2): best-W=(TxRate×TxSuccess)+(RxRate×RxSuccess)+(RSSI×k); wherein the notation best-W represents a best wireless network weight, the notation TxRate representing a transition rate of the wireless network device, the notation TxSuccess representing a count of data frames successfully send out by the wireless network device, the notation RxRate representing a receive rate of the wireless network device, the notation RxSuccess representing a count of data frames successfully received by the wireless network device, the notation RSSI representing a value of Received Signal Strength Indicator, and the notation k representing an experience constant.

9. The method of claim 3, wherein the said best wireless network weight is calculated by following equation (3): best-W=TxFailCount+RxWithCRC+RxDuplicate+RxDropDueToOutOfResource+FalseCCA+AMPDU TxFailCount+0.5(AMPDU PER/RSSI); wherein the notation best-W represents a best wireless network weight, the notation TxFailCount representing a count of data frames fail to be send out by the wireless network device, the notation RxWithCRC representing a count of data frames including cyclic redundancy check received by the wireless network device, the notation RxDuplicate representing the count of duplicate data frames, the notation RxDropDueToOutOfResource representing a count of data frames selected to be discarded resulted from all resources are in use, the notation FalseCCA representing a count of False Clear Channel Assessment, the notation AMPDU TxFailCount representing a false count of data frames at MAC layer, the notation PER representing the value of Packet Error Rate, and the notation RSSI representing a value of Received Signal Strength Indicator.

* * * * *